United States Patent Office 3,824,226
Patented July 16, 1974

3,824,226
PROCESS FOR THE PRODUCTION OF TRANS-
1,2-POLY-1,3-PENTADIENE
Peter Gunther, Opladen, Wolfgang Oberkirch, Cologne, Gottfried Pampus, Leverkusen, Friedrich Haas, Cologne, and Gunter Marwede, Leverkusen, Germany, assignors to Bayer Aktiengesellschaft, Leverkusen, Germany
No Drawing. Original application Mar. 4, 1971, Ser. No. 121,202, now abandoned. Divided and this application Mar. 7, 1973, Ser. No. 338,857
Claims priority, application Germany, Mar. 28, 1970, P 20 15 153.5
Int. Cl. C08d 1/14, 3/04
U.S. Cl. 260—94.3                    11 Claims

ABSTRACT OF THE DISCLOSURE

A catalyst system for the stereospecific polymerisation of 1,3-pentadiene into trans-1,2-poly-1,3-pentadiene, comprising (a) an anhydrous cobalt salt
(b) an acid amide or an ether and
(c) an organoaluminium compound and a process for polymerising 1,3-pentadiene in an inert solvent at temperatures of from —50° to +100° C. using the catalyst.

Cross-Reference to Related Application

This application is a division of application Ser. No. 121,202 filed Mar. 4, 1971 and now abandoned.

It is known that 1,3-pentadiene can be polymerised using catalysts containing cobalt compounds, organoaluminium compounds and thiophene or pyridine to form cis-1,4-poly-1,3-pentadiene [G. Natta et al., *European Polymer Journal*, 5, 1–13 (1969)].

It is also known that sterically uniform trans-1,3-pentadiene can be converted into trans-1,3-poly-1,3-pentadiene with a catalyst containing cobalt acetyl acetonate and diethyl aluminium chloride. Unfortunately, this catalyst system fails completely if the trans-1,3-pentadiene contains even small quantities of cis-1,3-pentadiene. No polymerisation at all occurs in this instance.

The present invention provides a catalyst system for the stereospecific polymerisation of 1,3-pentadiene into trans-1,2-poly-1,3-pentadiene, which comprises:

(i) an anhydrous cobalt salt,
(ii) an acid amide or an ether, and
(iii) an organoaluminium compound.

The present invention also relates to a process for the stereospecific polymerisation of 1,3-pentadiene into trans-1,2-poly-1,3-pentadiene which comprises polymerising 1,3-pentadiene in an inert solvent at a temperature of from —50 to +100° C. in the presence of a catalyst comprising:

(i) an anhydrous cobalt salt,
(ii) an acid amide or an ether, and
(iii) an organoaluminium compound.

Generally, the novel catalyst is distinguished by its particularly high activity. In the polymerisation process, this results in high conversions at short reaction times and small quantities of catalyst. The stereospecificity of the catalysts is also particularly pronounced. Thus, more than 95% of trans-double bonds are found in the polymer. Only 1,2-polymerisation takes place. Accordingly, the polymer is free from 1,4- and 3,4-bonds.

It is preferred to polymerise isomer mixtures of trans-1,3-pentadiene and cis-1,3-pentadiene containing up to about 25% by weight and preferably 8 to 25% by weight of the cis-isomer when using the catalyst according to the invention. Even if considerable amounts of cis-1,3-pentadiene are present, almost pure trans-1,2-poly-1,3-pentadiene is obtained, though other catalysts in this case have completely failed. Polymerisation proceeds quickly, without any difficulties and gives high yields.

Catalysts and their preparation

Cobalt salts suitable for the catalysts include anhydrous salts of inorganic and organic acids, especially strong mineral acids and aliphatic carboxylic acids. Examples of such salts include cobalt (II) chloride, cobalt (II) bromide, cobalt (II) nitrate, cobalt acetate, cobalt octoate and cobalt stearate. It is also possible to use phenolates, such as cobalt naphthenate, and alcoholates such as cobalt butylate, as well as complex salts, especially chelate complexes of divalent and trivalent cobalt, such as cobalt (II) or cobalt (III) acetylacetonate. It is preferred to use cobalt salts which are soluble in inert organic solvents, such as acetylacetonates, octoates or adducts of hexamethyl phosphoric acid triamide with cobalt halides or cobalt nitrates.

Acid amides suitable for use in the preparation of the catalysts include open chain and cyclic amides of organic carboxylic acids and of the acids of phosphorus. The carboxylic acid amides preferably correspond to the general formula:

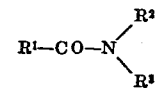

in which $R^1$, $R^2$ and $R^3$ are equal or different and represent hydrogen, alkyl (preferably $C_1$–$C_{16}$), cycloalkyl (preferably $C_5$–$C_7$), aryl (preferably phenyl, naphthyl, biphenyl) or $R^1$ and $R^2$ together with the nitrogen atom and carbonyl group, or $R^2$ and $R^3$, together with the nitrogen atom, represent a ring system optionally containing a hetero atom or atoms, the preferred ring system being a 5–7 membered aliphatic carboxylic system, which contains the N-atoms.

The following are examples of suitable carboxylic acid amides: dimethyl formamide, dimethyl acetamide, dibutyl acetamide, N-methyl pyrrolidone, N-methyl caprolactam, acetanilide, N-methyl acetanilide, N-ethylcyclohexyl acetamide, benzoyl morpholine and 1-methyl-2,4-dioxo-1,2,3,4-tetrahydroquinoline.

Examples of suitable amides of acids of phosphorus include alkyl or aryl phosphonous acid-bis-N-dialkylamides, for example methylphosphonous acid-bis-N-dimethylamide; alkyl- or aryl-phosphonic acid-bis-N-dialkyl amides, for example methylphosphonic acid-bis-N-dimethylamide; phosphorous acid-tris-N-dialkyl-(e.g. propyl)-amide; and phosphoric acid-tris-N-dialkylamides, for example hexamethylphosphoric acid triamide or phosphoric acid trimorpholide or tripiperidide.

In principle, symmetrical and asymmetrical dialkyl ethers, diaryl ethers, alkyl aryl ethers or cyclic ethers can be used for the process according to the invention, more especially dialkyl ethers having 1 to 6 carbon atoms in the alkyl groups, alkylene glycol-dialkyl ethers (also preferably having 1 to 6 carbon atoms in the alkyl and/or alkylene groups). The following are particularly suitable: ethylene glycol dimethyl ether, diethylene glycol dimethyl ether, tetraethylene glycol diethyl ether, dibutyl ether, anisole and dioxane.

Particularly suitable organoaluminium compounds are those corresponding to the formulae:

$$R_nX_{3-n}Al \text{ and } RXAl\text{—}O\text{—}AlXR$$

in which

X represents halogen, for example chlorine or bromine,
R represents an alkyl radical with 1 to 12 carbon atoms, and
n represents 1 or 2.

Suitable examples are aluminium dibutyl chloride, aluminium butyl dichloroide, aluminium dodecyl dichloride, aluminium didodecyl chloride (and the corresponding bromides) aluminium alkyl dihalides such as ethyl aluminium dichloride or ethyl aluminium sesquichloride (mixtures of $AlC_2H_5$—$Cl_2$ and $Al(C_2H_5)_2Cl$) are particularly preferred.

The molar ratio of aluminium compound to cobalt compound can be varied within wide limits and is preferably in the range from 1:1 to 1000:1, and most preferably from 10:1 to 500:1. The particular quantity of the acid amide component or of the ether is governed by the Al:Co ratio selected. The acid amide for the ether must be used in a molar ratio of less than 1, based on the aluminium compound, optimal results being obtained with a ratio of acid amide or ether to Al compound of from 0.3:1 to 0.9:1.

To prepare the catalyst, the cobalt compounds are, as a rule, initially added to a solvent, after which the acid amide or the ether is added in the molar ratios specified above, followed by the addition of the organo-aluminium compound to the resulting mixture. In some instances, cooling is necessary. The temperature at which the catalyst is prepared should preferably be from −50° to +100° C. and is most preferably below the boiling temperature of the solvent.

Examples of solvents suitable for use in the preparation of the catalyst include aliphatic and cycloaliphatic hydrocarbons such as pentane, heptane, cyclohexane or commercial petrol fractions; aromatic hydrocarbons such as benzene and toluene; and halogenated aliphatic or aromatic hydrocarbons such as chlorobenzene. It is particularly simple to use a commercial petrol fraction having a boiling range of from 50 to 200° C.

As described above, the catalyst can be prepared in the absence of the monomer to be polymerised. However, the catalyst can also be directly prepared in a solution of the monomer in one of the aforementioned solvents.

Polymerisation

For polymerisation, a solution of the monomer is usually combined with a solution of the catalyst, each in an inert organic solvent. The same solvents as those used in the preparation of the catalyst can be employed for polymerisation. It is preferred to use the same liquid both as polymerisation medium and as solvent for the catalyst. As already mentioned, the catalyst can also be directly prepared in the solution of the monomer. The polymerisation process is carried out at a temperature of from −50 to +150° C. and preferably at a temperature of from 0 to 70° C. The amount of catalyst required is minimal. It is sufficient to use 0.005 to 5, and preferably 0.01 to 0.2, mmols of cobalt per 100 g. of monomer. Polymerisation usually takes between 0.5 and 6 hours. The monomer conversions can be as high as 95%.

After the required conversion has been obtained, polymerisation is stopped, for example by adding an alcohol, carboxylic acid and/or amine. Any of the usual stabilisers and antiagers can be added to the polymer solution, for example from 0.2 to 3% by weight of phenyl-β-naphthylamine, 2,3-di-tert-butyl-4-methylphenol or 2,2′-dihydroxy-3,3′-di-tert-butyl-5,5′-dimethyldiphenylmethane.

The polymers can be isolated by conventional methods, for example by precipitation with an alcohol or by removing the solvent and residual monomers with steam.

The polymers prepared in accordance with the invention show outstanding behaviour when processed in the usual apparatus such as mixing rolls and internal mixers. For example, they show ideal sheet formation on rollers at ambient or elevated temperature, rapid filler absorption in internal mixers, a generally high capacity for fillers and effective dispersion of the conventional rubber additives such as carbon black or plasticisers. Although these polymers can contain a saturated main chain, extensive crosslinking with sulphur and the conventional accelerators, for example of the sulphenamide type, is nevertheless possible through the lateral double bonds. In the case of ethylene/propylene rubbers, this would have involved the complicated and almost uncontrollable process of terpolymerisation with conjungated dienes, for example ethylidene norbornene.

Vulcanisates obtained from the polymers produced in accordance with the invention show outstanding crosslinking properties, for example high strength and favourable elastic properties, comparable with those of known diene rubbers, for example cis-1,4-polybutadiene.

The most prominent property of vulcanisates obtained from the polymers prepared in accordance with the invention lies in their high resistance to ageing and reversion, for example their high resistance to ozone and oxygen, their weather resistance and their resistance to hot air and chemicals.

EXAMPLE 1

0.026 mMols of cobalt octoate in the form of a 0.01 m benzene solution are added to a mixture of 100 ml. of anhydrous n-heptane and 20 g. of dry 1,3-pentadiene, consisting of a commercial mixture containing 84% by weight of trans-1,3-pentadiene, 15% by weight of cis-1,3-pentadiene, 0.6% by weight of cyclopentane and 0.3% by weight of n-hexane. 3.9 mMols (0.7 ml.) of hexamethyl phosphoric acid triamide are then added to the resulting solution, followed by the introduction at around 20° C. of 1.7 ml. of a 50% by weight solution of ethyl aluminium dichloride in n-hexane ($\cong$6.5 mMols of $C_2H_5AlCl_2$). Polymerisation is carried out while stirring at 20 to 25° C. In the initial stages, precautions in the form of gentle cooling have to be taken to ensure that the temperature does not exceed 25° C. After 4 hours, polymerisation is stopped by adding a mixture of i-ipropanol, tri-n-butylamine and 2,2′-dihydroxy-3,3′-dit-tert-butyl-5,5′-dimethyldiphenylmethane as stabiliser, and the polymer is precipitated with alcohol. The polymer is then dried in vacuo at 50° C. until constant in weight.

Yield: 78%
trans-double bond content: 97% (infra-red spectroscopy).
[η]: 2.5 (as measured in toluene at 25° C.).

Comparison Example 12 mMols of diethyl aluminium chloride are added to a solution of 0.013 mMols of cobalt (III) acetylacetonate in 100 ml. of anhydrous n-heptane. 20 g. of dry 1,3-pentadiene (84% by weight trans-, 15% by weight cis, 0.6% by weight of cyclopentene and 0.3% by weight of n-hexane) are then added. After polymerisation for 16 hours at around 20° C., only traces of polymer are obtained.

EXAMPLES 2 to 15

The procedure is as described in Example 1. The cobalt compound is initially added to a mixture of monomer and solvent, followed by introduction of the acid amide or the ether and, finally, the organoaluminium compound. On completion of polymerisation, the procedure is as in Example 1.

The catalyst components, the ratio between the components, the solvents and the duration and temperature are all varied. The test conditions and results are set out in the following Table 1.

TABLE 1

| 1 | 2 | 3 | 4 | 5 | 6 | 7 | 8 | 9 | 10 | 11 | 12 |
|---|---|---|---|---|---|---|---|---|---|---|---|
| 2 | Co-octoate | HPT | $(C_2H_5)AlCl_2$ | 1:150:250 | 0.133 | Benzene | 4 | 20 | 83 | 70 | 0.9 |
| 3 | do | HPT | $(C_2H_5)AlCl_2$ | 1:150:250 | 0.065 | n-Heptane | 4 | 20 | 76 | 94 | 3.5 |
| 4 | do | HPT | $(C_2H_5)AlCl_2$ | 1: 75:125 | 0.13 | do | 4 | 20 | 76 | 96 | 3.2 |
| 5 | do | HPT | $(C_2H_5)AlCl_2$ | 1: 38: 63 | 0.065 | do | 4 | 20 | 77 | 96 | 4.2 |
| 6 | do | HPT | $(C_2H_5)AlCl_2$ | 1:150:250 | 0.13 | Cyclohexane | 4 | 20 | 79 | 95 | 3.0 |
| 7 | do | DMF | $(C_2H_5)AlCl_2$ | 1: 75:125 | 0.13 | n-Heptane | 4 | 20 | 78 | 96 | 3.6 |
| 8 | do | DMF | $(C_2H_5)AlCl_2$ | 1: 75:125 | 0.065 | do | 4 | 20 | 72 | 96 | 4.6 |
| 9 | do | DMA | $(C_2H_5)AlCl_2$ | 1:150:250 | 0.13 | do | 4 | 20 | 79 | 97 | 2.86 |
| 10 | do | DMA | $(C_2H_5)AlCl_2$ | 1: 75:125 | 0.065 | do | 4 | 20 | 74 | 96 | 4.2 |
| 11 | do | MPDA | $(C_2H_5)AlCl_2$ | 1: 75:125 | 0.065 | do | 4 | 20 | 74 | 96 | 4.2 |
| 12 | $CoCl_2 \cdot 2HPT$ | HPT | $(C_2H_5)AlCl_2$ | 1:150:250 | 0.13 | do | 4 | 20 | 46 | 96 | 6.0 |
| 13 | $Co(OOCCH_3)_2$ | HOT | $(C_2H_5)AlCl_2$ | 1:150:250 | 0.13 | do | 4 | 20 | 78 | 97 | 3.6 |
| 14 | $Co(acac)_2$ | HOT | $(C_2H_5)AlCl_2$ | 1:150:250 | 0.13 | do | 4 | 20 | 47 | 96 | 5.7 |
| 15 | $Co(acac)_2$ | Glyme | $(C_2H_5)AlCl_2$ | 1:125:250 | 0.13 | do | 4 | 20 | 70 | 96 | 2.3 |
| 16 | Co-octoate | HPT | $(C_2H_5)AlCl_2$ | 1:250:500 | 0.13 | Benzene | 4 | 20 | 87.5 | 81.8 | 2.0 |
| 17 | do | HPT | $(C_2H_5)AlCl_2$ | 1:250:670 | 0.13 | do | 4 | 20 | 79 | 56.6 | 1.6 |

Explanation of Table 1:

Column
1 = Example No.
2 = cobalt compound
3 = acid amide or ether
   HPT = hexamethylphosphoric acid triamide
   DMF = dimethyl formamide
   DMA = dimethyl acetamide
   MPDA = methylphosphonic acid-bis-N-dimethylamide
   Glyme = ethylene glycol dimethyl ether 4 = aluminum compound
5 = molar ratio of cobalt to acid amide or ether to Al
6 = mMols of cobalt/100 g. of monomer
7 = solvent
8 = polymerisation time in hours
9 = polymerisation temperature in ° C.
10 = yield in percent
11 = *trans*-1,2-content in percent
12 = viscosity [η] as measured in toluene at 25° C.

Comparisons with other polymers:

1. Rubber mixture—

|  | Parts by weight | | |
|---|---|---|---|
| *Cis*-1,4-polybutadiene [1] | 100 | | |
| *Trans*-1,2-poly-1,3-pentadiene [2] | | 100 | |
| *Cis*-1,4-polyisoprene [1] | | | 100 |
| Zinc oxide | 3 | 3 | 3 |
| Stearic acid | 3 | 3 | 3 |
| HAF carbon black | 50 | 50 | 50 |
| Aromatic plasticiser | 7 | 7 | 7 |
| VULCAZIT CZ (N-cyclohexylbenzothiazyl-2-sulphenamide) | 1.2 | 0.5 | 0.5 |
| Sulphur | 1.8 | 2.3 | 2.3 |

[1] Commercial products.
[2] Prepared in accordance with Example 1.

2. Vulcanisate properties of mouldings produced by roll-mixing (Standard ring I according to DIN 53 504), vulcanised for 30 minutes at 140° C. under 3 kg./cm.² pressure—

| | | | |
|---|---|---|---|
| Strength (kg./cm.²) DIN 53 504 | 120 | 135 | 180 |
| Elongation (percent) DIN 53 504 | 390 | 420 | 460 |
| Modulus at 300% elongation (kg./cm.²) DIN 53 504 | 75 | 70 | 85 |
| Hardness (Shore A) DIN 53 505 | 58 | 60 | 55 |
| Elasticity (percent) DIN 53 512 | 46 | 45 | 38 |
| Ageing in hot air after 10 days at 100° C.: | | | |
|   Strength (kg./cm.²) | 80 | 110 | 60 |
|   Elongation (percent) | 250 | 350 | 300 |
| Ageing in an oxygen cylinder according to Bierer and Davis at 70° C./21 atms. pressure after 10 days: | | | |
|   Strength (kg./cm.²) | 95 | 125 | 100 |
|   Elongation (percent) | 320 | 390 | 350 |

We claim:

1. A process for the production of trans-1,2-poly-1,3-pentadiene which comprises polymerizing 1,3-pentadiene in an inert solvent at a temperature of from −50 to 100° C. in the presence of a catalytic amount of a catalyst comprising:
   (i) an anhydrous cobalt salt,
   (ii) an acid amide which is an open chain or cyclic amide of an organic carboxylic acid or of an acid of phosphorus, a dialkyl ether, a diaryl ether or an aralkyl ether and
   (iii) an organoaluminum compound selected from the group consisting of $R_nX_{3-n}Al$ and
   $$RXAl—O—AlXR$$
   wherein R is alkyl having 1 to 12 carbon atoms, X is chlorine or bromine and n is 1 or 2,,
the molar ratio of (iii) to (i) being 1:1 to 1000:1 and the molar ratio of (ii) to (iii) being 0.3:1 to 0.9:1.

2. The process as claimed in claim 1 wherein the molar ratio of (iii) to (i) is from 10:1 to 500:1.

3. The process of claim 1 wherein said anhydrous cobalt salt is cobalt (II) chloride, cobalt (II) bromide, cobalt (II) nitrate, cobalt acetate, cobalt octoate, cobalt stearate, cobalt phenolate, cobalt alcoholate, cobalt (II) acetyl acetonate, cobalt (III) acetyl acetonate or a hexamethylphosphoric acid triamine adduct of a cobalt halide or cobalt nitrate.

4. The process of claim 1 wherein (ii) is an acid amide of the formula

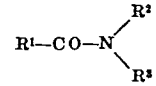

wherein $R^1$, $R^2$ and $R^3$ when taken separately are hydrogen, alkyl having 1 to 16 carbon atoms, cycloalkyl or aryl and $R^1$ and $R^2$ when taken together with the nitrogen atom and the carbonyl group of said formula or $R^2$ and $R^3$ when taken together with the nitrogen atom of said formula represent a 5- to 7-membered aliphatic ring moiety.

5. The process of claim 4 wherein said acid amide of said formula is dimethyl formamide, dimethyl acetamide, dibutyl acetamide, N-methyl pyrrolidone, N-methyl caprolactam, acetanilide, N-methyl acetanilide, N-ethyl cyclohexyl acetamide, benzoyl morpholine, or 1-methyl-2,4-dioxo-1,2,3,4-tetrahydroquinoline.

6. The process of claim 1 wherein (ii) is an amide of an acid of phosphorus which is an alkyl- or aryl-phosphonous acid-bis-N-dialkylamide, an alkyl- or aryl-phosphonic acid-bis-N-dialkylamide, a phosphorus acid tris-N-dialkylamide or a phosphoric acid-tris-N-dialkylamide.

7. The process of claim 1 wherein (ii) is an amide of an acid of phosphorus which is methylphosphonous acid-bis - N - dimethylamide, methylphosphonic acid-bis-N-dimethylamide, phosphorus acid - tris - N - dipropylamide, hexamethylphosphoric acid triamide, phosphonic acid trimorpholide or phosphoric acid tripiperidide.

8. The process of claim 1 wherein (ii) is a dialkyl ether, diaryl ether or alkylaryl ether.

9. The process of claim 1 wherein (ii) is ethylene glycol dimethyl ether, diethylene glycol dimethyl ether, tetraethylene glycol diethyl ether, dibutyl ether, anisole or dioxane.

10. The process of claim 1 wherein (iii) is ethyl aluminum dichloride or ethyl aluminum sesquichloride.

11. The process of claim 1 wherein said 1,3-pentadiene comprises trans-1,3-pentadiene and from 0 to 25% by weight of cis-1,3-pentadiene.

References Cited

UNITED STATES PATENTS

| | | | |
|---|---|---|---|
| 3,045,001 | 7/1962 | Berger | 260—93.5 |
| 3,213,073 | 10/1965 | Coover et al. | 260—93.7 |
| 3,462,406 | 8/1969 | Natta et al. | 260—94.3 |
| 3,522,332 | 7/1970 | Ichikawa et al. | 260—94.3 |
| 3,535,303 | 10/1970 | Ichikawa et al. | 260—94.3 |
| 3,634,340 | 1/1972 | Gunther et al. | 260—2 |

JOSEPH L. SCHOFER, Primary Examiner

W. F. HAMROCK, Assistant Examiner

U.S. Cl. X.R.

252—429 B